United States Patent
Tinella et al.

(10) Patent No.: US 9,236,960 B1
(45) Date of Patent: *Jan. 12, 2016

(54) CALIBRATION CIRCUIT AND METHODS FOR CALIBRATING HARMONICS IN A MIXER

(71) Applicant: Marvell International Ltd., Hamilton (BM)

(72) Inventors: Carlo Tinella, Pavia (IT); Fernando De Bernardinis, Pavia (IT); Jody Greenberg, Campbell, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/642,933

(22) Filed: Mar. 10, 2015

Related U.S. Application Data (63) Continuation of application No. 13/774,060, filed on Feb. 22, 2013, now Pat. No. 8,977,211.

(60) Provisional application No. 61/604,891, filed on Feb. 29, 2012.

(51) Int. Cl.
*H04B 17/00* (2015.01)
*H04B 17/21* (2015.01)
*H04B 1/12* (2006.01)

(52) U.S. Cl.
CPC ............... *H04B 17/21* (2015.01); *H04B 1/123* (2013.01); *H04B 17/0085* (2013.01); *H04B 2215/064* (2013.01)

(58) Field of Classification Search
CPC ............. H04B 17/004; H04B 17/0062; H04B 17/0085; H04B 17/005; H04B 2215/064; H04B 2215/065

USPC ............. 455/67.11, 67.13, 67.14, 226.1, 230, 455/231, 296, 305, 310, 311, 323

See application file for complete search history.

(56) References Cited

U.S. PATENT DOCUMENTS

| | | |
|---|---|---|
| 5,008,636 A | 4/1991 | Markinson et al. |
| 7,254,379 B2 | 8/2007 | Xu et al. |

(Continued)

OTHER PUBLICATIONS

Greenberg, Jody, Fernando De Bernardinis, Carlo Tinella, Antonio Milani, Johnny Pan, Paola Uggetti, Marco Sosio, Shaoan Dai, Sam Tang, Giovanni Cesura, Gabriele Gandolfi, Vittorio Colonna, and Rinaldo Castello. "9.1 a 40MHz-to-1GHz Fully Integrated Multistandard." 2012 IEEE International Solid-State Circuits Conference, ISSCC 2012 / Session 9 / Wireless Tranceiver Techniques / 9.1 (Apr. 2012): 3 pages.

(Continued)

*Primary Examiner* — Duc M Nguyen (57) ABSTRACT

A calibration circuit for calibrating harmonics in a mixer. The calibration circuit includes an RF signal path configured to receive an RF signal corresponding to an output of the mixer, selectively receive a test signal injected into the RF signal path, and provide feedback to the mixer according to the RF signal and/or the test signal. The test signal corresponds to a selected harmonic of the harmonics in the mixer. A measurement circuit is configured to detect, in the output of the mixer, the test signal injected into the RF signal path. A calibration module is configured to receive a feedback signal indicative of the test signal detected in the output of the mixer and, based on the feedback signal indicative of the test signal detected in the output of the mixer, adjust a duty cycle associated with the mixer to calibrate the selected harmonic.

18 Claims, 12 Drawing Sheets

(56) References Cited

U.S. PATENT DOCUMENTS

| | | | |
|---|---|---|---|
| 7,612,629 | B2 | 11/2009 | Pepper |
| 7,738,851 | B2 | 6/2010 | Cooley et al. |
| 7,881,688 | B1 | 2/2011 | He |
| 8,467,755 | B2 | 6/2013 | Olson |
| 8,761,708 | B2 | 6/2014 | Chen et al. |
| 2004/0002320 | A1 | 1/2004 | Lin |
| 2004/0203453 | A1 | 10/2004 | Vaananen |
| 2006/0189290 | A1* | 8/2006 | Olson ............... 455/285 |
| 2007/0042740 | A1 | 2/2007 | Woo-nyun |
| 2007/0275674 | A1 | 11/2007 | Chien |
| 2008/0051053 | A1 | 2/2008 | Fedan |
| 2010/0026906 | A1 | 2/2010 | Okanobu |
| 2010/0203860 | A1* | 8/2010 | Tillman et al. ............ 455/325 |
| 2011/0075721 | A1 | 3/2011 | Minakawa et al. |
| 2011/0182335 | A1 | 7/2011 | Pratt et al. |

OTHER PUBLICATIONS

Kivekäs, Kalle, Aarno Pärssinen, and Kari A. Halonen. "Characterization of IIP2 and DC-Offsets in Transconductance Mixers." IEEE Transactions on Circuits and Systems-II: Analog and Digital Signal Processing vol. 48, No. 11 (Nov. 2001): 11 pages.

Manstretta, Danilo, Massimo Brandolini, and Francesco Svelto. "Second-Order Intermodulation Mechanisms in CMOS Downconverters." IEEE Journal of Solid-State Circuits vol. 38, No. 3 (Mar. 2003): 13 pages.

Weldon, Jeffrey A., R. Sekhar Narayanaswami, Jacques C. Rudell,, Li Lin, Masanori Otsuka, Sebastien Dedieu, Luns Tee, King-Chun Tsai, Cheol-Woong Lee, and Paul R. Gray. "A 1.75-GHz Highly Integrated Narrow-Band CMOS Transmitter With Harmonic-Rejection Mixers." IEEE Journal of Solid-State Circuits 36.12 (Dec. 2001): 13 pages.

* cited by examiner

FIG. 12
Duty Cycle > 50%

FIG. 11
Duty Cycle < 50%

CALIBRATION CIRCUIT AND METHODS FOR CALIBRATING HARMONICS IN A MIXER

CROSS-REFERENCE TO RELATED APPLICATIONS

The present disclosure is a continuation of U.S. patent application Ser. No. 13/774,060 (now U.S. Pat. No. 8,977, 211), filed on Feb. 22, 2013, which claims the benefit of U.S. Provisional Application No. 61/604,891, filed on Feb. 29, 2012. The entire disclosures of the applications referenced above are incorporated herein by reference.

FIELD

The present disclosure relates to mixers, and more particularly to systems and methods for calibrating harmonic rejection in switching mixers.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Radio frequency (RF) receivers typically rely on hard-switched mixers to perform down conversion. Down conversion refers to translation of an incoming modulated signal from a higher frequency to a lower frequency. Up conversion from a lower frequency to a higher frequency is also performed when transmitting the signal.

Figure 1A:
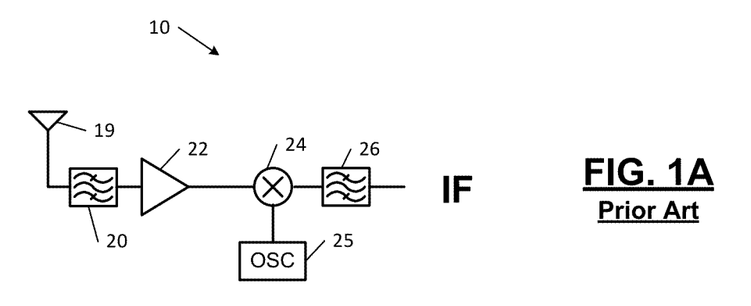
FIG. 1A is a functional block diagram of an example of a receiver including a mixer.

FIG. 1 shows an example of a portion of an RF receiver 10 to perform down conversion. The RF receiver 10 includes an antenna 19 that is coupled to an optional RF filter 20 and a low noise amplifier 22. An output of the amplifier 22 is coupled to a first input of a mixer 24. A second input of the mixer 24 is connected to a local oscillator (LO) 25, which provides a reference frequency. The mixer 24 converts radio frequency (RF) signals to intermediate frequency (IF) signals. An output of the mixer 24 is connected to an optional IF filter 26. The RF receiver 10 may include additional circuits to perform additional down conversion and processing.

Figure 1B:
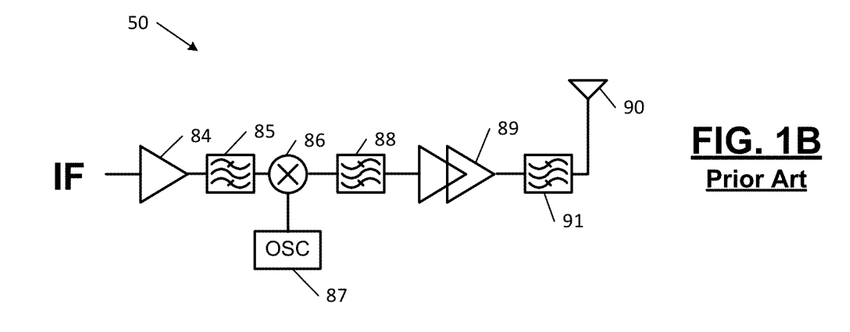
FIG. 1B is a functional block diagram of an example of a transmitter including a mixer.

FIG. 1B shows an example of a portion of an RF transmitter 50 to perform up conversion. The transmitter 50 includes a variable gain amplifier (VGA) 84 that receives IF signals and that is coupled to an optional IF filter 85. The optional IF filter 85 is connected to a first input of an IF to RF mixer 86. A second input of the mixer 86 is connected to an oscillator 87, which provides a reference frequency. An output of the mixer 86 is coupled to an optional RF filter 88. The optional RF filter 88 is connected to a power amplifier 89, which may include a driver. The power amplifier 89 drives an antenna 90 through an optional RF filter 91.

When a frequency range of the incoming modulated signal of the RF receiver has an upper-bound larger than twice a lower bound, harmonic mixing can be an issue. Unwanted signals lying on harmonic frequencies of the local oscillator are down converted and interfere with the wanted signal, which lies on a fundamental frequency of the local oscillator.

Harmonic rejection mixers attempt to reduce odd harmonic mixing. Intrinsic device matching is typically exploited to reject even harmonics. However, these approaches are not always sufficient to reduce even and odd harmonics, which adversely impacts silicon yield.

As used herein, $\eta$ refers to duty cycle and $\eta_{nom}$ refers to 50% duty cycle. $DC_{offset}$ refers to DC offset with respect to a predetermined threshold voltage or current value (such as zero).

Balanced $\eta$ refers to duty cycle equal to 50% (or ½) and unbalanced $\eta$ refers to duty cycle not equal to 50% (or ½). $IM_n$ refers to $n^{th}$ order inter-modulation. As $IM_n$ decreases, linearity increases. $IIP_n$ refers to $n^{th}$ order input referred intercept point. IIP is proportional to $1/IM_n$. Therefore, linearity increases as $IIP_n$ increases.

Figure 2:
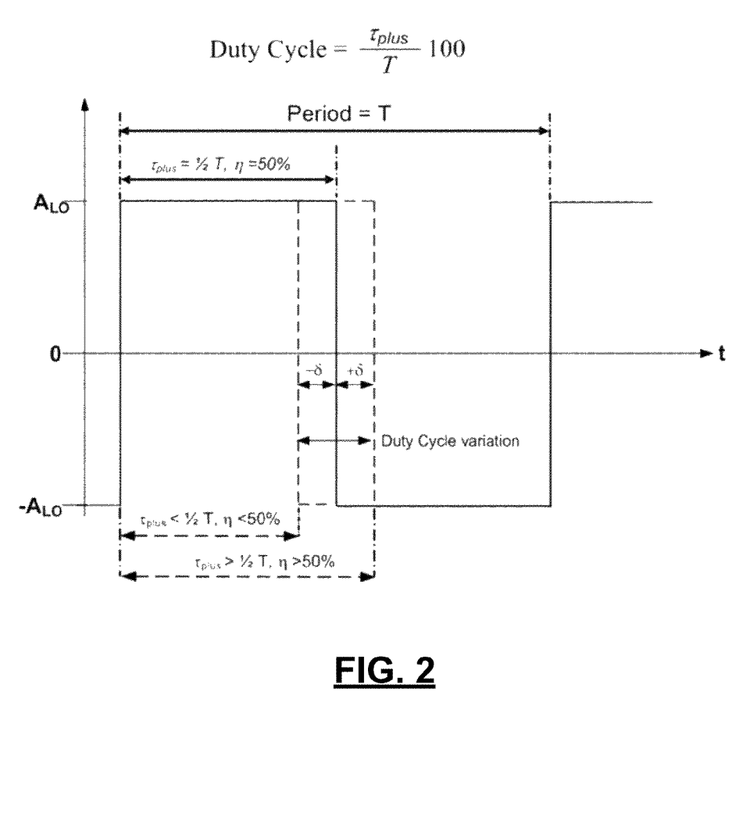
FIG. 2 illustrates the effective duty cycle of a square wave.

FIG. 2 illustrates a duty cycle of a square wave signal. The pulse width $\tau_{plus}$ represents a period that the square wave signal is positive while the pulse period T represents a period of the local oscillator square wave. T is related to the fundamental frequency $f_{LO}$ of the LO as $f_{LO} = 1/T$.

Figure 3:
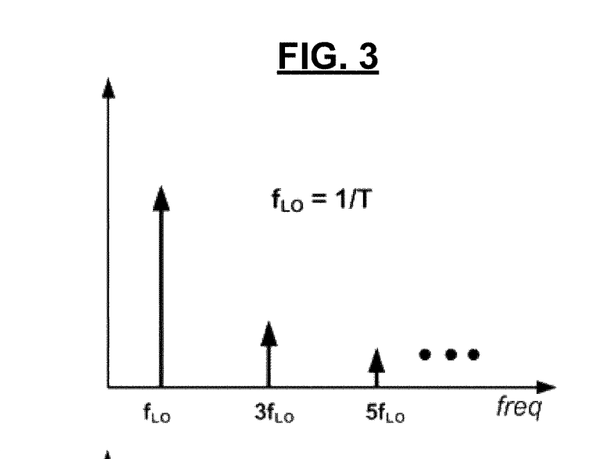
FIG. 3 illustrates odd harmonics in response to a balanced duty cycle.
Figure 4:
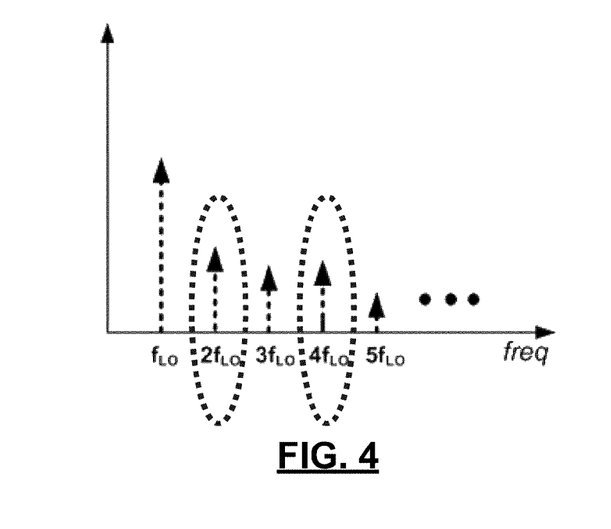
FIG. 4 illustrates even harmonics that occur in response to an imbalanced duty cycle.

Duty cycle is typically defined as the ratio of the pulse width to the period T and it is quantified as a percentage. For example, if the pulse width to period ratio is ½, then the effective duty cycle is 50%. Under these conditions, the square wave LO spectrum includes only odd harmonics of the fundamental frequency as can be seen in FIG. 3. Moreover, these harmonics have energy than decreases with increasing frequency. When the effective duty cycle is not equal to 50%, the LO spectrum also includes even harmonics as can be seen in FIG. 4.

Figure 5:
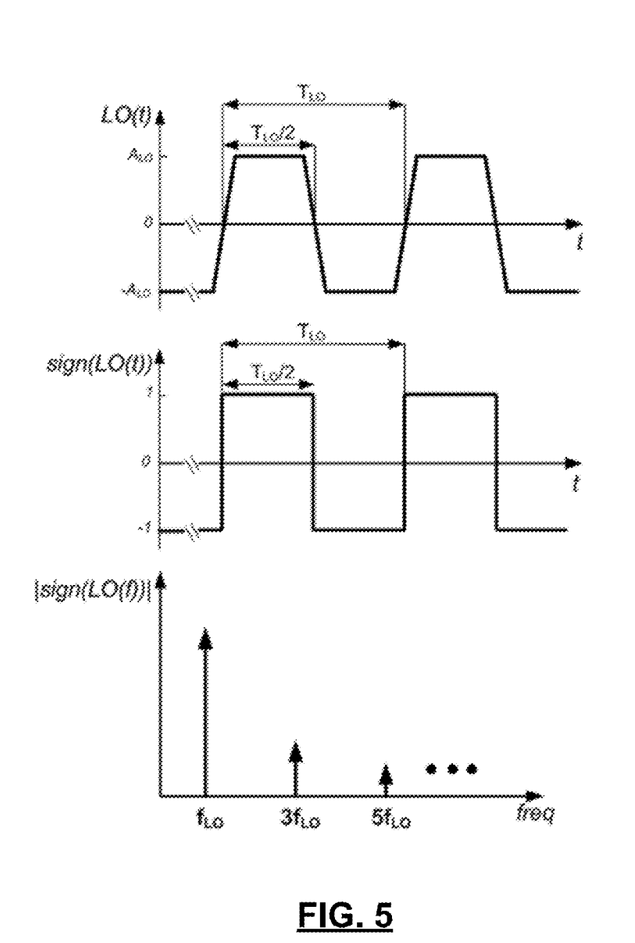
FIG. 5 illustrates a sign function for a square wave.
Figure 6:
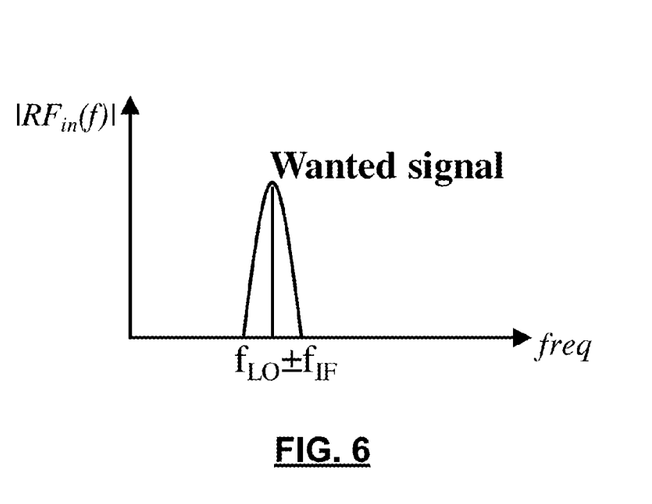
FIG. 6 illustrates amplitude as a function of frequency for an example RF signal.
Figure 7:
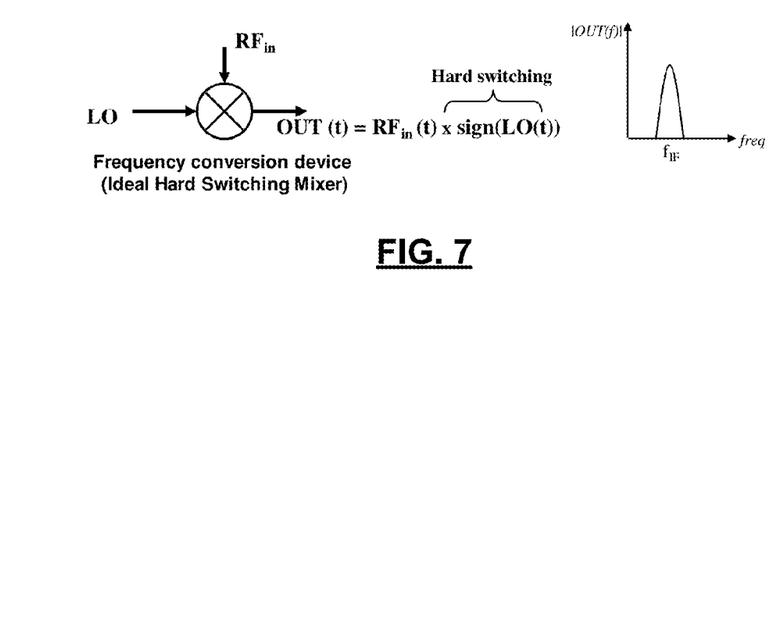
FIG. 7 illustrates frequency conversion of the signal in FIG. 6 performed by an ideal hard-switched mixer.

FIGS. 5-7 illustrate a hard-switching mixer performing down-conversion in a receiver. Incoming RF signal energy at $f_{LO} \pm f_{IF}$ is converted to a lower frequency $f_{IF}$. The operation produced by the hard-switched mixer can be viewed as a multiplication, in the time domain, between the incoming RF signal and the sign of the local oscillator waveform. The time domain multiplication with the sign(LO) is what differentiates hard-switched mixers from analog multipliers where the RF incoming signal is multiplied with the LO waveform.

Because of the periodic and bipolar nature of the LO waveform, sign(LO) is a square-wave with the same period as the original LO waveform. Consequently, if the effective duty cycle of sign(LO) is 50%, the spectrum includes the odd harmonics. If the incoming RF signal includes only energy around the fundamental frequency of the LO ($f_{LO}$), the rich harmonic content of sign(LO) is not an issue since only the useful/wanted energy will be translated around $f_{IF}$ and processed. However if the incoming RF signal has energy around the harmonics of the LO, hard-switched operation may create issues.

Figure 8:
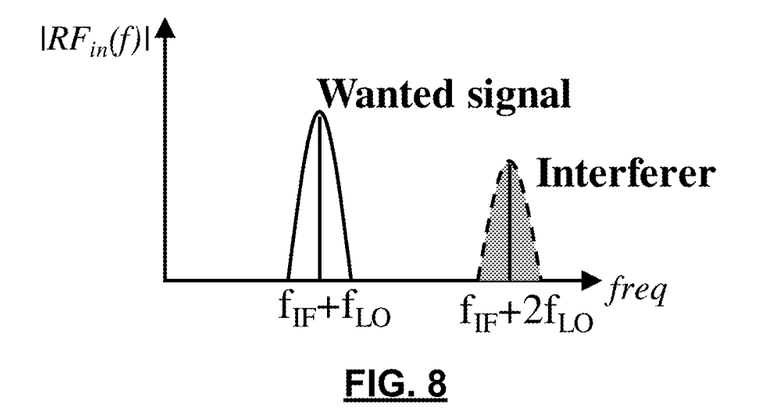
FIG. 8 illustrates amplitude as a function of frequency for a wanted signal and an interferer.
Figure 9:
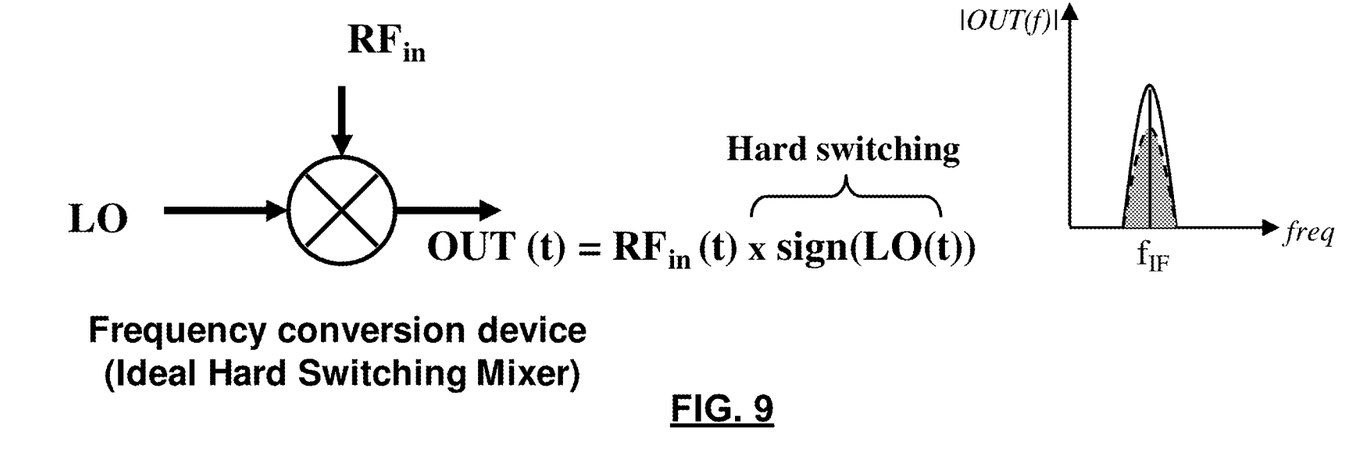
FIG. 9 illustrates frequency conversion of the signal in FIG. 8 performed by an ideal hard-switched mixer.

Referring now to FIGS. 8-9, when the incoming RF signal energy spreads close to any of the LO harmonics with some interferers, the nature of the hard-switched mixer downconverts the interferer to IF as well. Harmonic mixing distortion occurs when the interferer energy folds over the useful signal, which corrupts the information in the useful signal. Harmonic mixing distortion is an issue in wireless systems that handle RF bands (incoming for the RX and outgoing for the TX) where the upper bound is 2 or more times the lower bound.

When the LO is balanced (or equivalently has a duty cycle of 50%), harmonic distortion should be considered for odd LO harmonics. However, when the LO has a duty cycle that is different than 50%, even order harmonics appear in the sign (LO) spectrum. RF interferers located close to the even LO harmonics fold over the useful signal. Dotted lines in FIG. 9 illustrates the case where the LO has a duty cycle different than 50%, which leads to the down conversion at $f_{IF}$ of the interferer placed at $f_{IF} + 2f_{LO}$.

SUMMARY

A system includes a radio frequency (RF) signal path configured to receive an input signal that includes at least one of a test signal and an RF signal. A local oscillator (LO) signal path is configured to supply a LO signal. A mixer includes a first input in communication with the RF signal path and a second input in communication with the LO signal path. A calibration control module is configured to receive an output of the mixer in response to the test signal and to adjust an effective duty cycle of the LO signal in the LO signal path based on the output of the mixer.

In other features, the test signal comprises a tone at one of an odd or even multiple of a fundamental frequency of a wanted signal. The calibration control module adjusts a gain of the RF signal path and a phase of the LO signal path. An analog to digital converter (ADC) module is configured to convert an output of the mixer to a digital signal. A signal processing module is configured to analyze the digital signal and to generate a feedback signal.

In other features, the calibration control module receives a feedback signal and adjusts at least one of the effective duty cycle, the gain and the phase based on the feedback signal. The LO signal path includes a DC offset module configured to adjust the effective duty cycle by adjusting a DC offset of the LO signal. The calibration control module communicates with the DC offset module.

In other features, the DC offset module includes a first transistor including a first terminal, a second terminal and a control terminal, a second transistor including a first terminal, a second terminal and a control terminal, a first resistor connected between the first terminal of the first transistor and a voltage reference, a second resistor connected between the first terminal of the second transistor and the voltage reference, a first variable current source connected to a node between the first resistor and the first transistor, and a second variable current source connected to a node between the second resistor and the second transistor.

In other features, the calibration control module adjusts the gain of the RF signal path, the phase of the LO signal path and the effective duty cycle of the LO signal using a plurality of iterations. The calibration control module adjusts the gain of the RF signal path, the phase of the LO signal path, and the effective duty cycle of the LO signal using a weighting function.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 10:
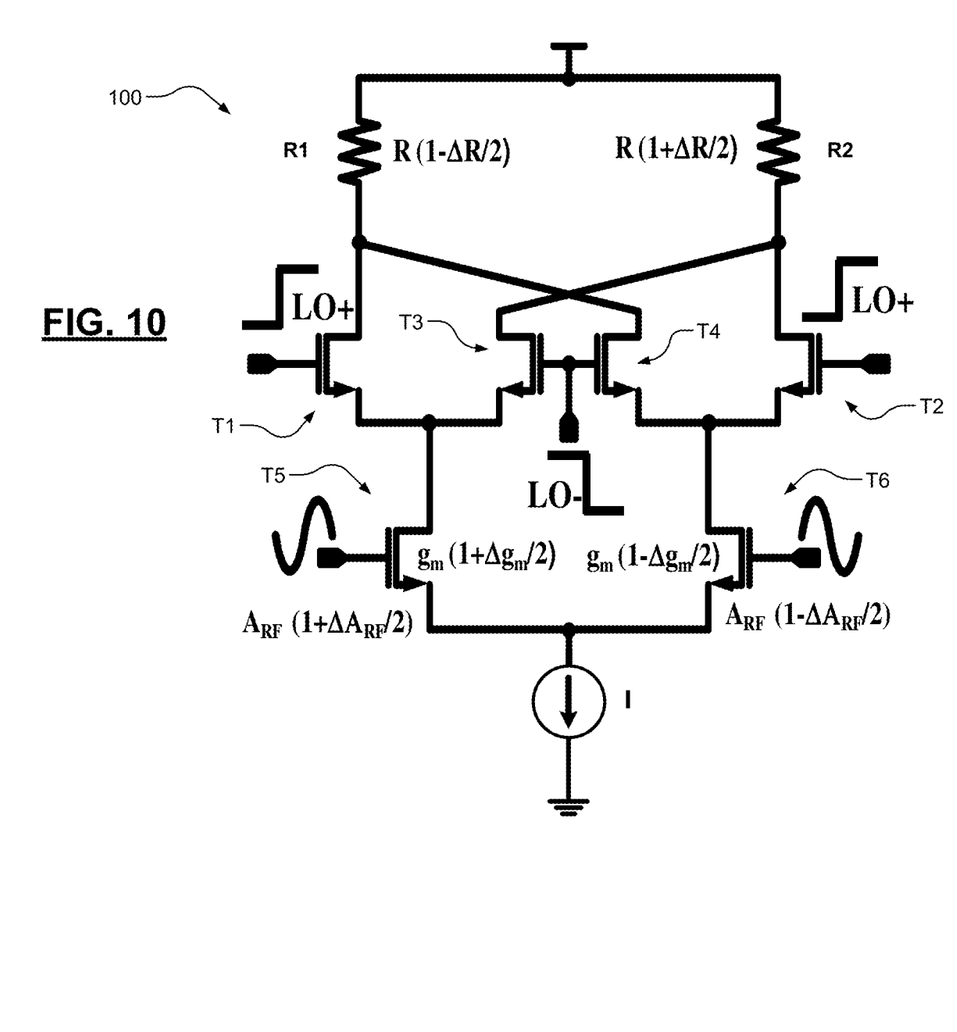
FIG. 10 is an electrical schematic of an example of a mixer.

FIG. 10 shows an example of a hard-switched mixer 100. The mixer 100 includes transistors T1, T2, T3 and T4. First terminals of transistors T1 and T3 are connected together and to a resistor R1. First terminals of transistors T2 and T4 are connected together and to a resistor R2. The resistors R1 and R2 are connected to a voltage reference. Second terminals of transistors T1 and T3 are connected together and to a first terminal of transistor T5. Second terminals of transistors T2 and T4 are connected together and to a first terminal of transistor T6. Second terminals of the transistors T5 and T6 are connected to a current source I. Control terminals of the transistors T1 and T2 receive one polarity of the local oscillator signal. Control terminals of the transistors T3 and T4 receive the other polarity of the local oscillator signal. Control terminals of the transistors T5 and T6 receive the RF signal.

Intermodulation is a measure of the mixer linearity performance. When $IM_2$ rises, mixer linearity decreases. When the LO has a duty cycle that deviates from the optimal 50%, $IM_2$ and even order intermodulation increases. $IIP_2$ is a function of non-ideal characteristics or mismatch of the differential structure shown in FIG. 10. When the LO square wave does not have a balanced duty cycle and $\Delta\eta \neq 0$, the imbalance combines with the other mismatch like $\Delta gm$, $\Delta A_{RF}$, and $\Delta R$ and may lead to a lowering of $IIP_2$ or equivalently $IM_2$ rises. In the equation below, $\alpha'_2$ is the second-order nonlinearity coefficient relative to an input transconductance stage of the mixer and $\Delta\eta$, $\Delta g_m$, $\Delta A_{RF}$, and $\Delta R$ are the mismatch in percent of the LO switching duty-cycle, transconductance of the mixer driver stage, RF signal amplitude, and load resistance, respectively. In K. Kivekas et al. "Characterization of IIP2 and DC-Offsets in Transconductance Mixer," IEEE Trans. On Circuits & Systems—II, vol. 48, no. 11, Nov. 2001, it was shown:

$$iip2_{Double-Bal} \approx \frac{\sqrt{2}}{\pi \eta_{nom} \alpha_2'} \times \frac{4}{(2\Delta\eta(\Delta g_m + \Delta A_{RF}) + \Delta R(1 + \Delta g_m)(1 + \Delta A_{RF}))}$$

$$IIP_2 \approx \frac{\sqrt{2}}{\pi \eta_{nom} \alpha_2'} \times \frac{4}{(2\Delta\eta(\Delta g_m + \Delta A_{RF}) + \Delta R(1 + \Delta g_m)(1 + \Delta A_{RF}))}$$

$$IIP_2 \approx \frac{\sqrt{2}}{\pi \eta_{nom} \alpha_2'} \times \frac{4}{[(2\Delta\eta + \Delta R)(\Delta g_m + \Delta A_{RF}) + \Delta R + \Delta R \Delta A_{RF} \Delta g_m]}$$

$\Delta R \Delta A_{RF} \Delta g_m$ is a negligible higher order mismatch term. Therefore, $IIP_2 \to \infty$ where:

$$\Delta\eta = \Delta\eta_0 \text{ and } \Delta\eta_0 = -\frac{\Delta R}{2}\left[1 + \frac{1}{\Delta g_m + \Delta A_{RF}}\right].$$

Besides even harmonic distortion, LO duty cycle imbalance has other detrimental effects on the performance of the mixer. If there is noise instead of or in addition to interferers close to the LO harmonics, harmonic mixing may increase noise in the final down converted band at $f_{IF}$. LO and RF leakage to the output of the mixer may also occur.

Figure 11:
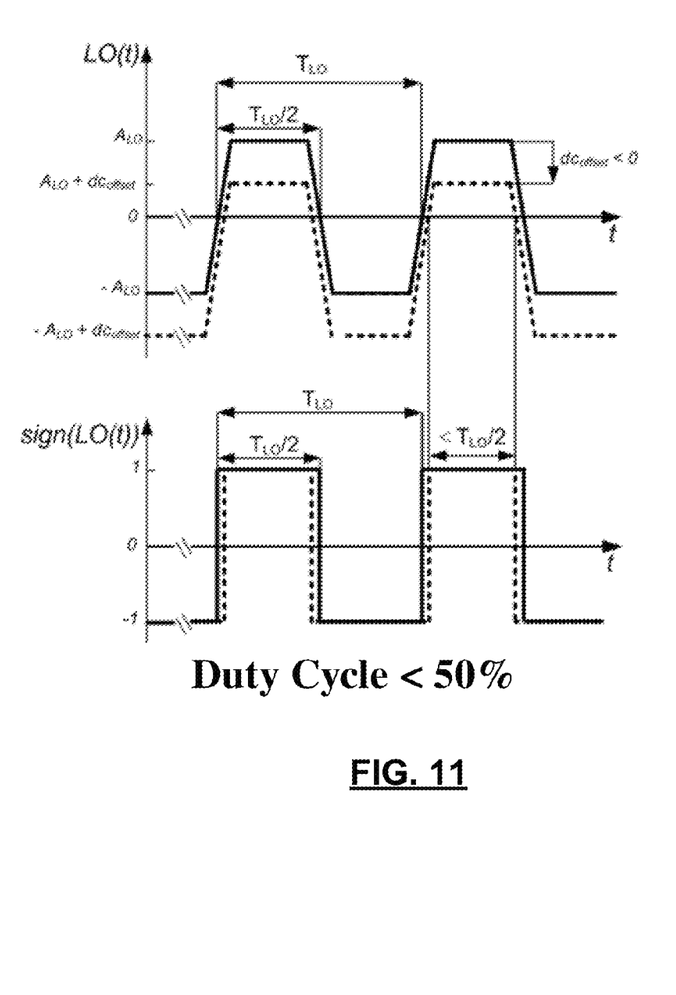
FIGS. 11 and 12 illustrate changes in duty cycle due to DC offset.
Figure 12:
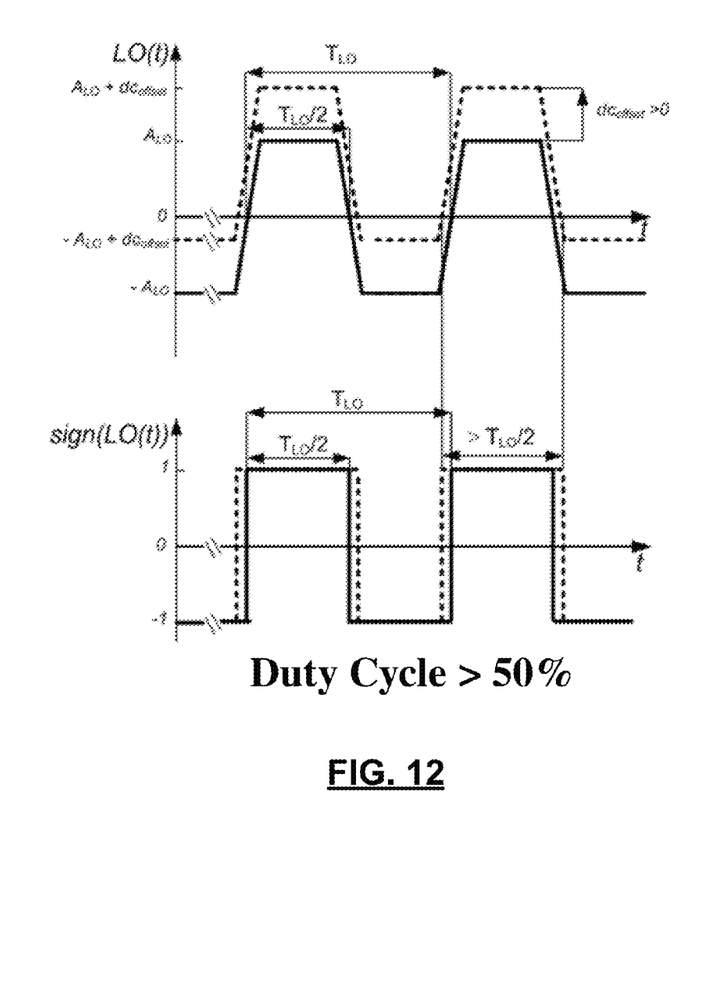

FIGS. 11 and 12 illustrate duty cycle imbalance is equivalent to DC offset in the original LO(t) waveform for hard-switched mixers. In other words, a DC offset in the original bipolar periodic waveform LO(t) is translated into duty cycle variation in the sign(LO(t)) function. Sign(LO(t)) is the multiplying function of hard-switched mixers. In the examples shown, a positive DC offset in LO(t) translates in a duty cycle >50% for sign(LO(t)). Conversely, a negative DC offset in LO(t) translates in a duty cycle <50% for sign(LO(t)).

According to the present disclosure, both odd harmonic and even harmonic calibration are based on similar principles. An injection path in the RF signal path allows insertion of a test signal. Both foreground and background schemes are deployable. For example, for 2nd harmonic calibration, a test signal at $2*f_{LO}$ is injected. Different signals are possible, for example pure tones (such as sine signals), pseudo-random signals, etc. can be used.

A measurement circuit in the IF path detects the test signal. In some examples, the signal power is measured. Alternately, digital filtering may be applied and then the signal power can be measured. The process is repeated for each harmonic to be calibrated. As can be appreciated, calibration results may affect several harmonics at once. Therefore, an iterative process may be used.

Odd harmonic calibration may be achieved by adjusting phase and gain calibration controls, or a subset of them. Search algorithms can be applied to phase and gain controls to minimize a harmonic mixing cost function. When analyzing rejection of the 3rd and 5th harmonics, examples of cost functions include Max(HR3, HR5), HR3 only (HR5 is usually correlated), weighted average of HR3 and HR5, etc. In general, multi-objective optimization may be performed. For example, mixer paths can be calibrated sequentially. Gain and Phase can be calibrated sequentially. Iterations may apply, e.g. calibration of phase, then gain, then phase, etc.

Analysis of even order harmonic rejection can be performed by altering the LO duty cycle. In one example, the effective duty cycle can be altered by changing the DC offset of the LO. Calibration can be achieved by injecting a tone at $2*f_{LO}$ and minimizing second order harmonic mixing. The power of the down converted tone can be measured. The effective duty cycle can be changed to minimize the measured power.

For example, all possible settings of DC offset can be tested. In general, a cost function of even order harmonic mixing can be minimized. Examples of cost functions may include Max(HR2, HR4). In order to achieve concurrent even and odd harmonic calibration, multiple calibration steps may be performed due to interactions between even and odd harmonic calibration.

Figure 13:
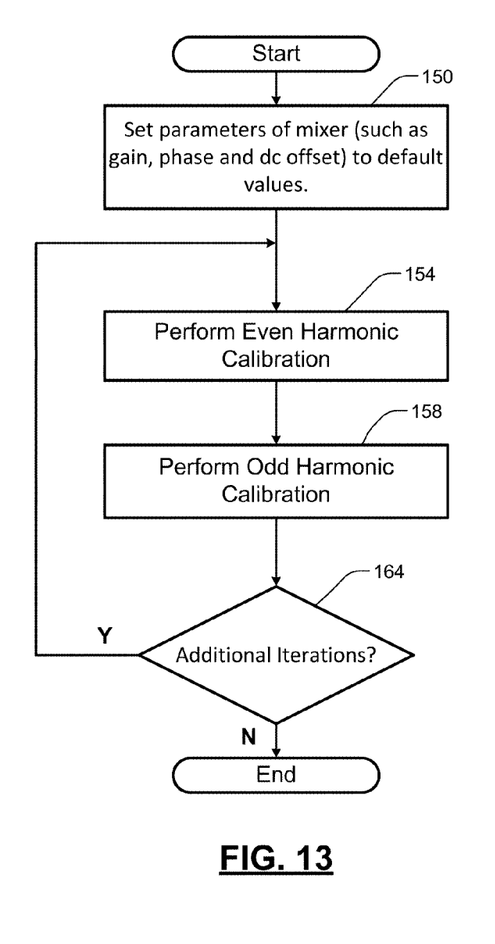
FIG. 13 is a flow chart illustrating an example of a method for calibrating even and odd harmonic rejection according to the present disclosure.
Figure 14:
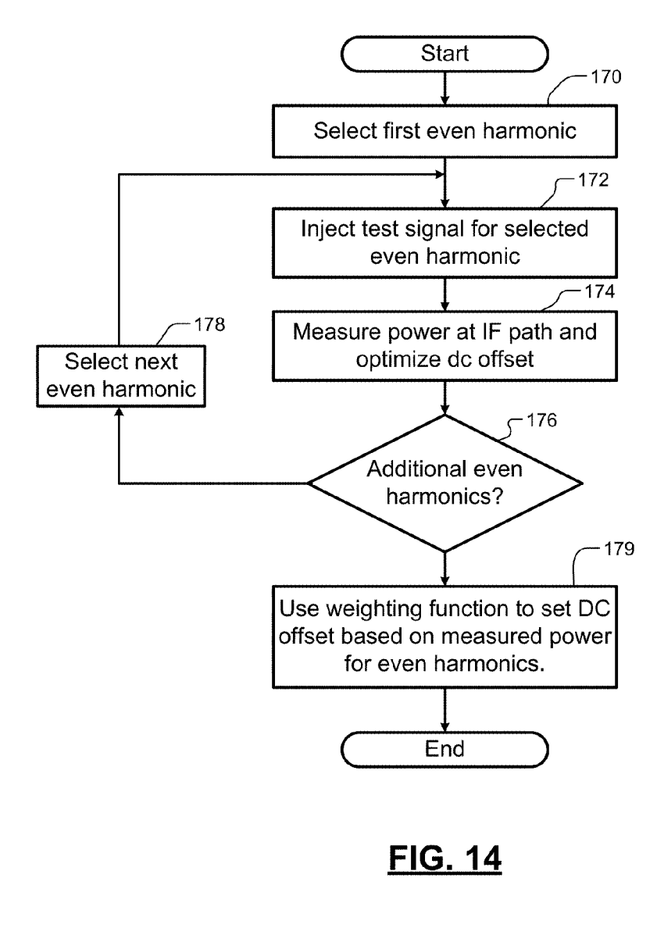
FIG. 14 is a flowchart illustrating an example of a method for calibrating even harmonic rejection according to the present disclosure.
Figure 15:
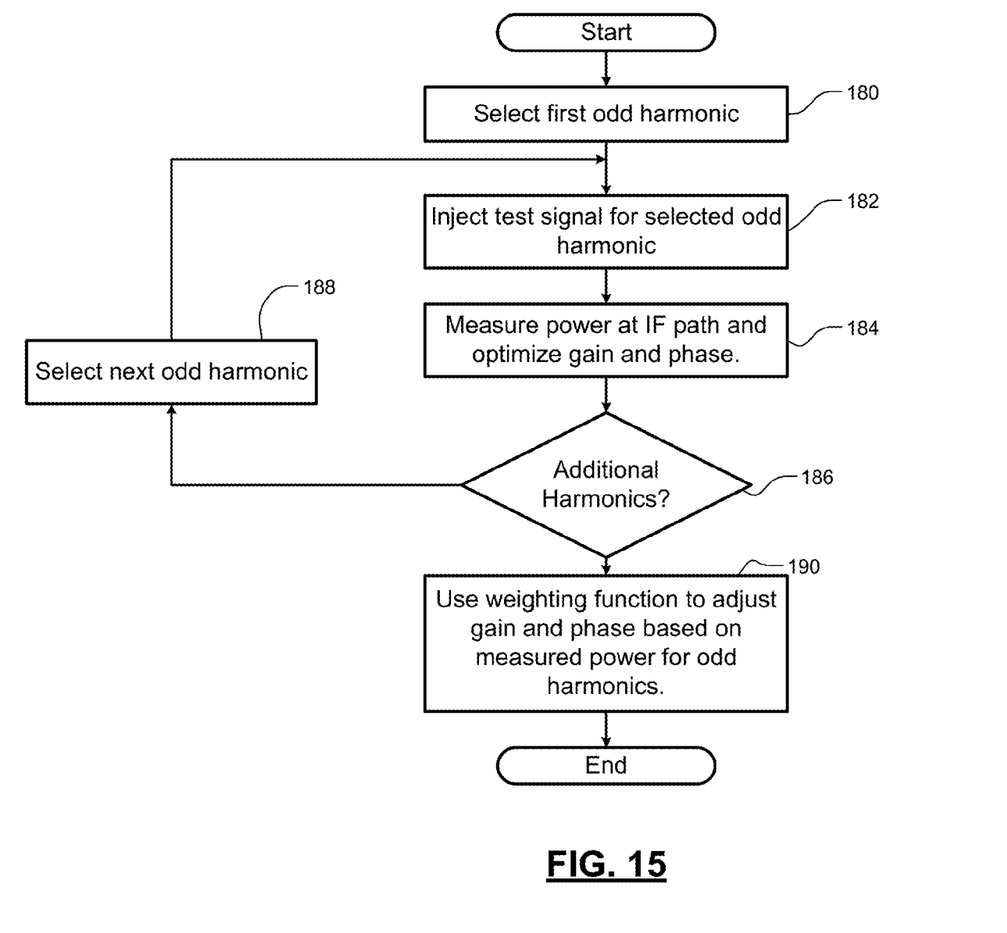
FIG. 15 is a flowchart illustrating an example of a method for calibrating odd harmonic rejection according to the present disclosure.

FIGS. 13-15 show examples of methods for harmonic calibration according to the present disclosure. In FIG. 13, control sets parameters of the mixer (such as gain, phase and/or DC offset) to default values at 150. At 154, even harmonic calibration is performed. At 158, odd harmonic calibration is performed. At 164, control determines whether additional iterations are required. If true, control returns to 154. Otherwise, control ends. As can be appreciated, additional iterations may include either even or odd harmonic calibration rather than both even and odd harmonic calibration.

In FIG. 14, an example of even harmonic calibration is illustrated. At 170, the first even harmonic is selected. At 172, a test signal is injected for the selected even harmonic. At 174, power is measured in the IF path. At 176, control determines whether additional even harmonics need to be calibrated. If 176 is true, the next even harmonic is selected at 178 and control returns to 172. If 176 is false, control uses a weighting function or other mechanism for adjusting DC offset based on the measured power.

In FIG. 15, an example of odd harmonic calibration is illustrated. At 180, the first odd harmonic is selected. At 182, a test signal is injected for the selected odd harmonic. At 184, power is measured in the IF path. At 186, control determines whether additional odd harmonics need to be calibrated. If 186 is true, the next odd harmonic is selected at 188 and control returns to 182. If 186 is false, control uses a weighting function or other mechanism for adjusting gain and phase based on the measured power.

Figure 16:
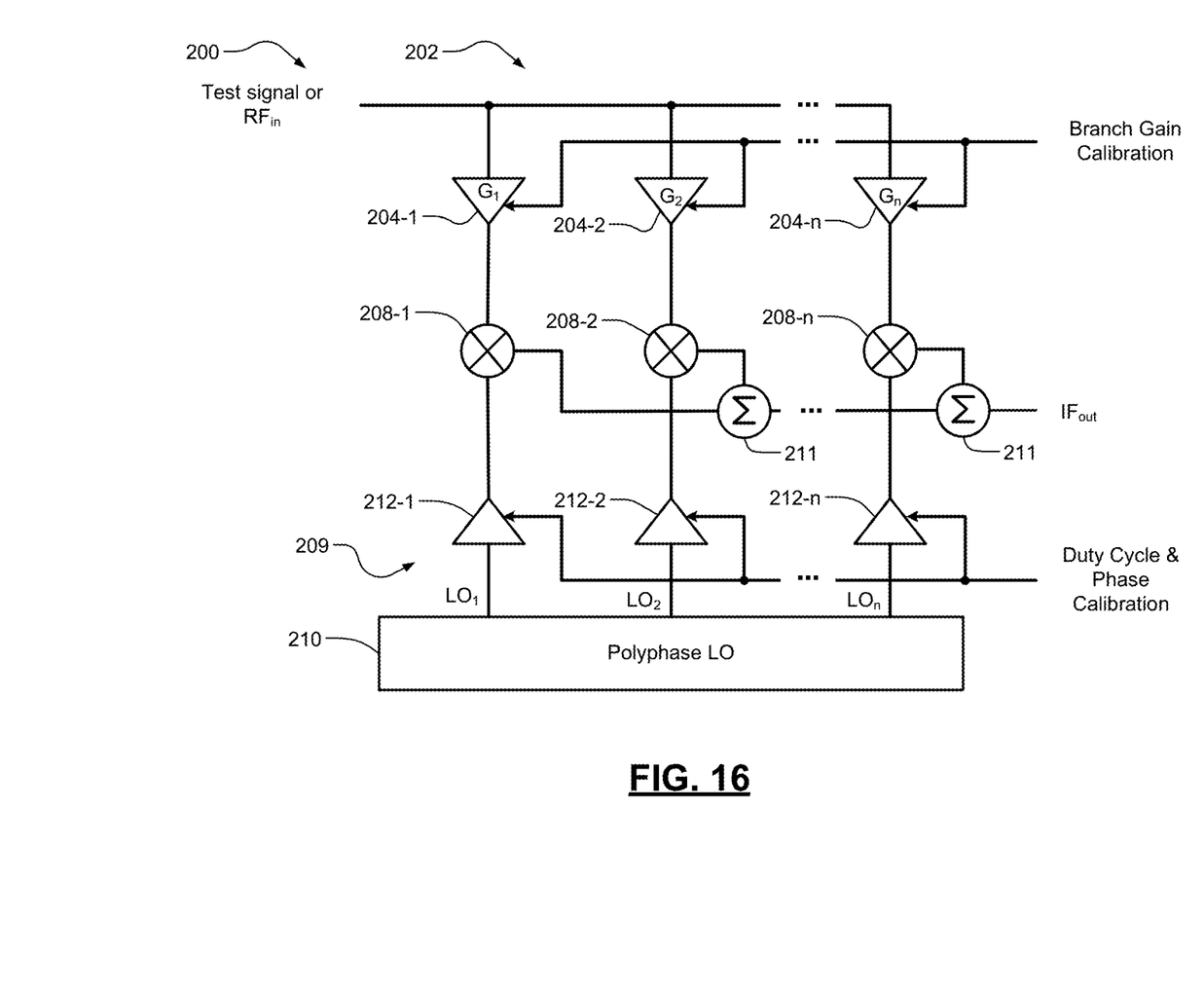
FIG. 16 is an electrical schematic and block diagram illustrating a portion of a calibration circuit for a mixer according to the present disclosure.

FIG. 16 shows an example of a circuit 200 that may be used to cancel harmonic distortion in a mixer. The circuit 200 includes an RF path 202, which receives a test signal and/or an RF signal. For example only, the test signal may include signals such as tones at a predetermined frequency or more complex test signals. The test signal is input to amplifiers 204-1, 204-2, . . . , and 204-$n$, each including an adjustable gain $G_1$, $G_2$, . . . , and $G_n$, respectively. Each of the amplifiers 204-1, 204-2, . . . , and 204-$n$ receives one or more branch gain calibration signals to adjust the gains $G_1$, $G_2$, . . . , and $G_n$. Outputs of the amplifiers 204-1, 204-2, . . . , and 204-$n$ are input to a first input of mixers 208-1, 208-2, . . . , and 208-$n$, respectively. One or more summers 211 may be used to combine outputs of the mixers.

A local oscillator path 209 includes a polyphase local oscillator 210 that generates $LO_1$, $LO_2$, . . . , and $LO_n$, which are input to amplifiers 212-1, 212-2, . . . , and 212-$n$, respectively. Each of the amplifiers 212-1, 212-2, . . . , and 212-$n$ receives a duty cycle and phase calibration signal, which adjusts a duty cycle and/or phase of the local oscillator signal. Outputs of the amplifiers 212-1, 212-2, . . . , and 212-$n$ are input to a second input of mixers 208-1, 208-2, . . . , and 208-$n$, respectively. An intermediate frequency output signal ($IF_{out}$) is generated by the outputs of the mixers 208-1, 208-2, . . . , and 208-$n$.

Figure 17:
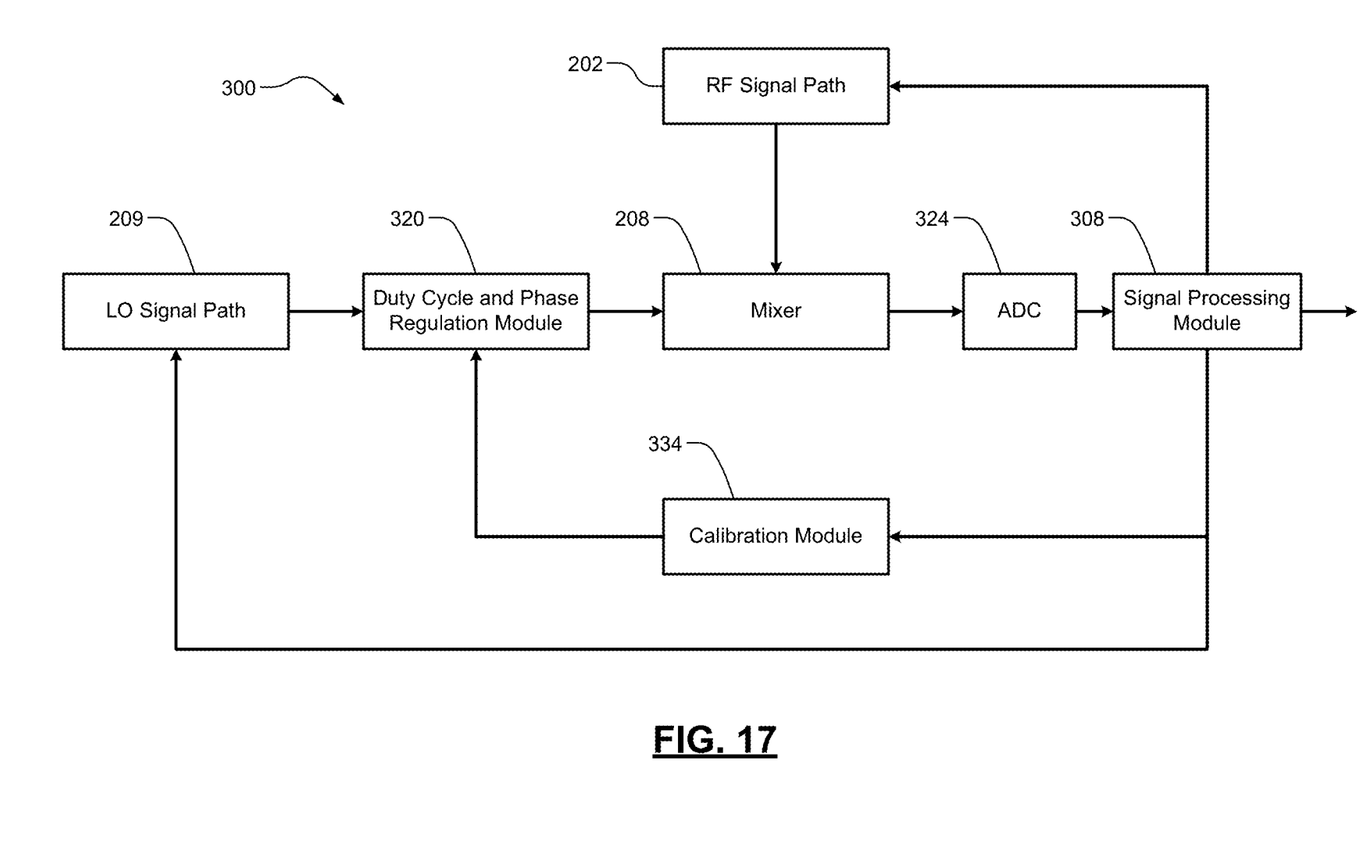
FIG. 17 is a functional block diagram illustrating an example of a calibration circuit according to the present disclosure.

FIG. 17 shows an example of a mixer circuit 300 with harmonic rejection that includes the circuit 200 from FIG. 13 along with additional circuits used to reduce or cancel harmonic distortion. The circuit 300 includes a signal processing module 308 that provides the branch gain calibration to the RF signal path 202 and a control signal to select a phase of the LO. The signal processing module 308 provides control signals to the LO signal path 209 to adjust the polyphase LO. The signal processing module 308 provides feedback to a calibration module 334. The calibration module 334 provides control signals to a duty cycle and phase regulation module 320, which adjusts the effective duty cycle and phase of the LO. An output of the mixer 208 is input to an analog to digital converter (ADC) 324, which converts an analog mixer output to a digital mixer output. The digital mixer output from the ADC 324 is input to the signal processing module 308.

Figure 18:
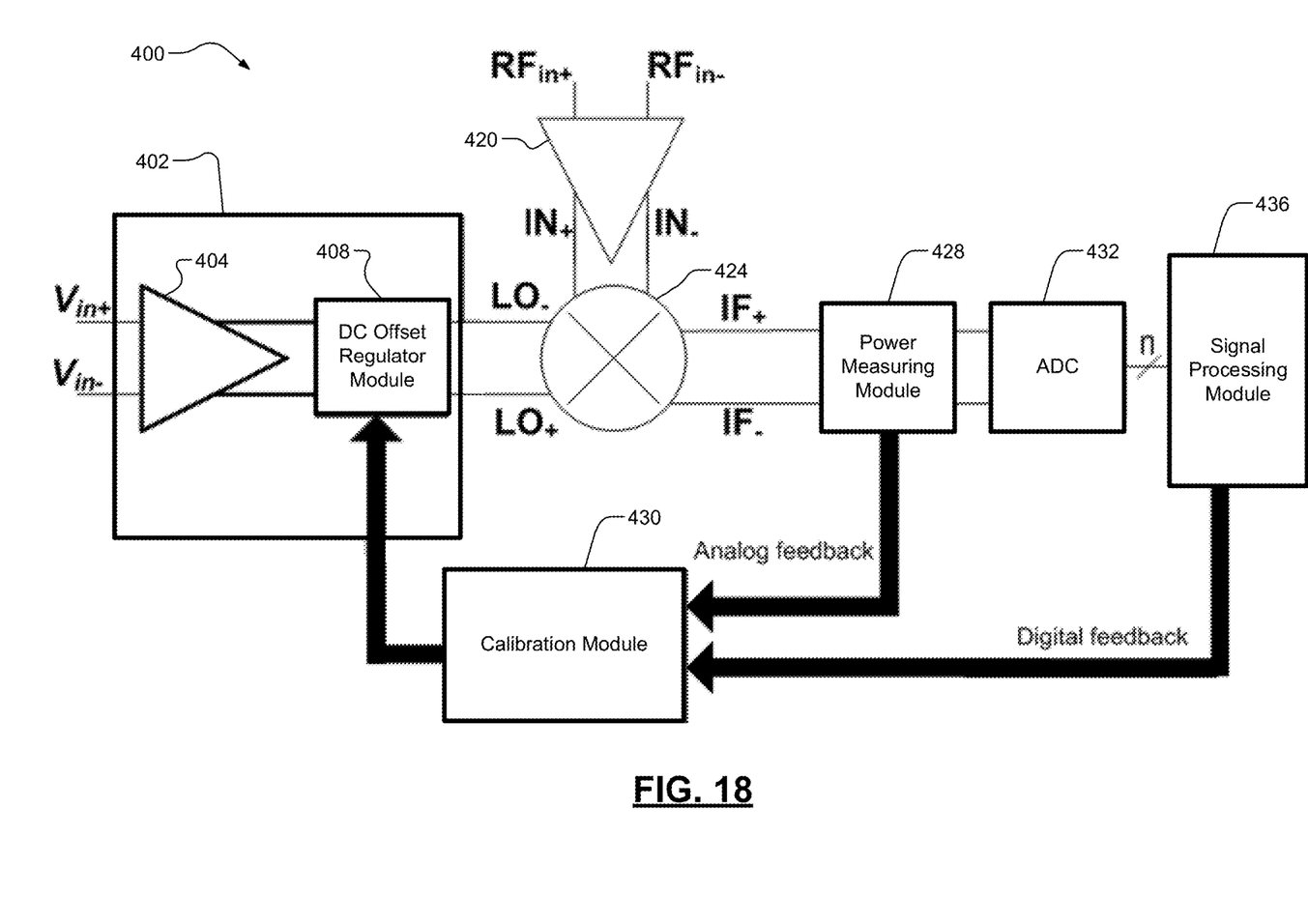
FIG. 18 is a functional block diagram and electrical schematic of another example of a calibration circuit according to the present disclosure.

FIG. 18 shows an example of a differential mixer circuit 400 with harmonic distortion reduction. A local oscillator adjustment circuit 402 receives a differential LO signal input, which is amplified by amplifier 404 and output to DC offset module 408. An output of the DC offset module 408 is input to a mixer 424. A differential RF signal is input to an amplifier 420. An output of the amplifier 420 is input to the mixer 424. A differential output of the mixer 424 is input to a power measuring module 428, which measures a power level of the differential IF signal. While the power measuring module 428 is shown in a particular location, the power measuring module 428 may be arranged in different locations or performed by other components described herein. An output of the power measuring module 428 is input to an ADC 432, which converts the differential IF signal to a digital signal. An output of the ADC 432 is input to a signal processing module 436.

The power measuring module 428 provides analog feedback to a calibration module 430. The signal processing module 436 provides digital feedback to the calibration module 430. The calibration module 430 provides a control signal to the DC offset module 408 to adjust DC offset of the LO signal.

Figure 19:
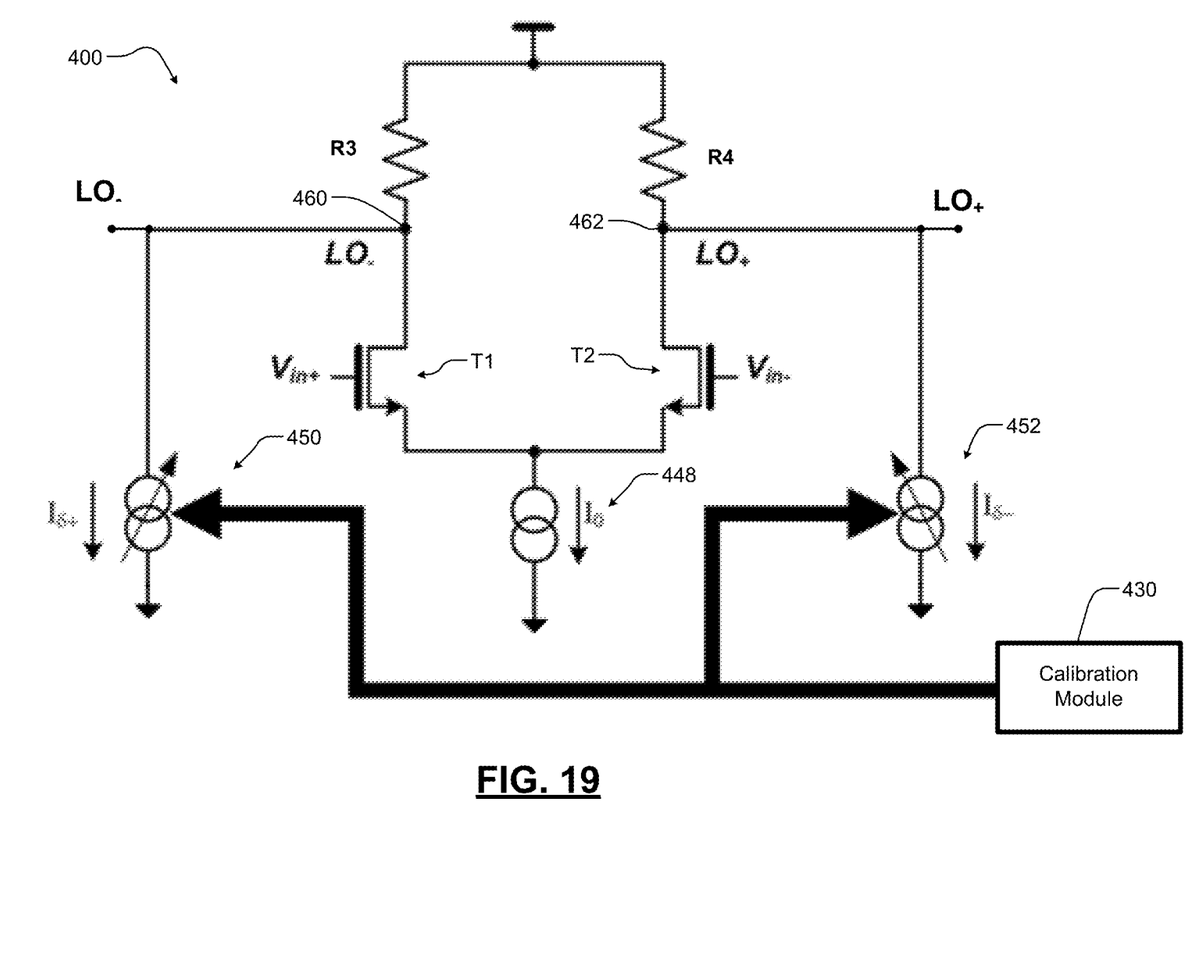
FIG. 19 is a functional block diagram and electrical schematic of a portion of the calibration circuit of FIG. 18 for adjusting DC offset.

FIG. 19 shows an example of the local oscillator adjustment circuit 402 of FIG. 18. The local oscillator adjustment circuit 402 includes transistors T1 and T2. A control terminal of the transistor T1 receives one input of the differential LO input signal input $V_{in+}$ and a control terminal of the transistor T2 receives one input of the differential LO input signal input $V_{in-}$. First terminals of the transistors T1 and T2 are connected by resistors R3 and R4 to a voltage reference. Second terminals of the transistors T1 and T2 are connected to a current source 448. Variable current sources 450 and 452 vary current to first and second nodes 460 and 462 located between the first terminals of the transistors T1 and T2 and the respective resistors R3 and R4. The differential local oscillator output is taken at the first and second nodes. Varying the current adjusts the effective duty cycle offset.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A calibration circuit for calibrating a plurality of harmonics in a mixer, the calibration circuit comprising:
    a radio frequency (RF) signal path configured to (i) receive an RF signal corresponding to an output of the mixer, (ii) selectively receive a test signal injected into the RF signal path, wherein the test signal corresponds to a single harmonic selected from the plurality of harmonics in the mixer, and wherein the single harmonic is iteratively adjusted until each of the plurality of harmonics is selected, and (iii) provide feedback to the mixer according to the RF signal and/or the test signal injected into the RF signal path;
    a measurement circuit configured to detect, in the output of the mixer, the test signal injected into the RF signal path; and
    a calibration module configured to (i) receive a feedback signal indicative of the test signal detected in the output of the mixer and (ii) based on the feedback signal indicative of the test signal detected in the output of the mixer, adjust a duty cycle associated with the mixer to calibrate the selected harmonic.

2. The calibration circuit of claim 1, wherein, to calibrate the selected harmonic, the calibration module is configured to adjust the duty cycle associated with the mixer to reduce and/or cancel the selected harmonic.

3. The calibration circuit of claim 1, wherein, to adjust the duty cycle associated with the mixer, the calibration module is configured to adjust a duty cycle of a local oscillator signal provided to the mixer.

4. The calibration circuit of claim 3, wherein, to adjust the duty cycle of the local oscillator signal provided to the mixer, the calibration module is configured to adjust a DC offset of the local oscillator signal.

5. The calibration circuit of claim 1, wherein the selected harmonic corresponds to an even harmonic or an odd harmonic associated with the mixer.

6. The calibration circuit of claim 1, wherein, to detect the test signal injected into the RF signal path, the measurement circuit is configured to detect a signal power of an intermediate frequency signal in the output of the mixer.

7. The calibration circuit of claim 1, wherein the calibration module is further configured to, based on the feedback signal indicative of the test signal detected in the output of the mixer, adjust a phase associated with the mixer to calibrate the selected harmonic.

8. The calibration circuit of claim 7, wherein the phase corresponds to a phase of a local oscillator signal provided to the mixer.

9. The calibration circuit of claim 1, further comprising a signal processing module configured to adjust, based on the output of the mixer, a gain associated with the RF signal path.

10. A method for calibrating a plurality of harmonics in a mixer, the method comprising:
   at a radio frequency (RF) signal path,
      receiving an RF signal corresponding to an output of the mixer,
      selectively receiving a test signal injected into the RF signal path, wherein the test signal corresponds to a single harmonic selected from the plurality of harmonics in the mixer, and wherein the single harmonic is iteratively adjusted until each of the plurality of harmonics is selected, and
      providing feedback to the mixer according to the RF signal and/or the test signal injected into the RF signal path;
   detecting, in the output of the mixer, the test signal injected into the RF signal path;
   receiving a feedback signal indicative of the test signal detected in the output of the mixer; and
   based on the feedback signal indicative of the test signal detected in the output of the mixer, adjusting a duty cycle associated with the mixer to calibrate the selected harmonic.

11. The method of claim 10, wherein calibrating the selected harmonic includes adjusting the duty cycle associated with the mixer to reduce and/or cancel the selected harmonic.

12. The method of claim 10, wherein adjusting the duty cycle associated with the mixer includes adjusting a duty cycle of a local oscillator signal provided to the mixer.

13. The method of claim 12, wherein adjusting the duty cycle of the local oscillator signal provided to the mixer includes adjusting a DC offset of the local oscillator signal.

14. The method of claim 10, wherein the selected harmonic corresponds to an even harmonic or an odd harmonic associated with the mixer.

15. The method of claim 10, wherein detecting the test signal injected into the RF signal path includes detecting a signal power of an intermediate frequency signal in the output of the mixer.

16. The method of claim 10, further comprising, based on the feedback signal indicative of the test signal detected in the output of the mixer, adjusting a phase associated with the mixer to calibrate the selected harmonic.

17. The method of claim 16, wherein the phase corresponds to a phase of a local oscillator signal provided to the mixer.

18. The method of claim 10, further comprising adjusting, based on the output of the mixer, a gain associated with the RF signal path.

* * * * *